United States Patent [19]
Fisher

[11] Patent Number: 6,136,282
[45] Date of Patent: Oct. 24, 2000

[54] METHOD FOR REMOVAL OF HYDROGEN SULFIDE FROM GASEOUS STREAMS

[75] Inventor: Kevin S. Fisher, Georgetown, Tex.

[73] Assignee: Gas Research Institute, Chicago, Ill.

[21] Appl. No.: 09/310,253

[22] Filed: May 12, 1999

Related U.S. Application Data

[60] Provisional application No. 60/094,525, Jul. 29, 1998.

[51] Int. Cl.[7] .................................................. B01D 53/56
[52] U.S. Cl. ........................... 423/220; 423/226; 423/228
[58] Field of Search ..................................... 423/226, 228, 423/220

[56] References Cited

U.S. PATENT DOCUMENTS

| | | | |
|---|---|---|---|
| 5,128,049 | 7/1992 | Gatlin | 423/226 |
| 5,462,721 | 10/1995 | Pounds | 423/226 |

OTHER PUBLICATIONS

Kevin Fisher: *Initial Results from GRI's 30 MMscf/Day Direct–Injection $H_2S$ Scavenging Test Facility*, presented at The Third Gas Research Institute Sulfur Recovery Conference, Austin, Texas, Oct. 12–15, 1997.

Isom, C., et al. "Sour Gas Treatment . . . ", Chemical Eng. (NY), vol. 101, issue #7, pp 147–148, Jul. 1994.

*Primary Examiner*—Tom Dunn
*Assistant Examiner*—Peter DiMauro
*Attorney, Agent, or Firm*—Pauley Petersen Kinne & Fejer

[57] ABSTRACT

A method for removal of $H_2S$ from an $H_2S$-containing natural gas stream in which a high surface area contactor is inserted into the natural gas stream and at least one $H_2S$ scavenging agent is injected into the natural gas stream upstream of the contactor, the result of which is the distribution of the $H_2S$ scavenging agent on at least a portion of at least one surface of the contactor. The distributed $H_2S$ scavenging agent is contacted with the natural gas stream resulting in absorption of the $H_2S$ into the $H_2S$ scavenging agent and reaction therewith, forming at least one byproduct. Thereafter, the byproduct is removed from the natural gas stream.

4 Claims, 8 Drawing Sheets

METHOD FOR REMOVAL OF HYDROGEN SULFIDE FROM GASEOUS STREAMS

CROSS REFERENCE TO RELATED APPLICATION

This application claims the benefit of U.S. Provisional Application Ser. No. 60/094,525, filed Jul. 29, 1998.

BACKGROUND OF THE INVENTION

1. Field of the Invention

This invention relates to a method for removal of hydrogen sulfide from a hydrogen sulfide containing gaseous stream utilizing a hydrogen sulfide scavenging agent distributed over a high surface area contactor disposed within the stream of hydrogen sulfide containing gas. More particularly, this invention is related to a method for removal of hydrogen sulfide from natural gas utilizing a high surface area contactor for providing intimate contact between hydrogen sulfide scavenging agent liquids and the natural gas. This method is particularly suitable for natural gas streams containing small amounts of hydrogen sulfide, typically less than about 200 ppm of hydrogen sulfide.

2. Description of Prior Art

Substantial amounts of sour natural gas are currently being produced from natural gas wells, oil wells (as associated gas), and from natural gas storage reservoirs that have been infected with $H_2S$-producing bacteria. The presence of hydrogen sulfide in fuel and other gaseous streams has long been of concern for both the users and the producers of such gaseous streams. For example, in the case of natural gas, historically about 25% of the natural gas produced in the United States has been sour, that is, containing greater than about 4 ppmv $H_2S$ (5.7 mg $H_2S/m^3$). In addition to the corrosive and other adverse effects that such impurities have upon equipment and processes with which such gaseous streams interact, noxious emissions are commonly produced from combustion of the natural gas as a result of oxidation of the hydrogen sulfide. The resulting sulphur oxides are a major contributor to air pollution and may have detrimental impact upon humans, animals, and plant life. Increasingly stringent federal and state regulations have accordingly been promulgated in an effort to reduce or eliminate sulphurous emissions, and a concomitant interest exists in efficiently removing from natural gas streams and the like the hydrogen sulfide that comprises a significant precursor of the emissions.

A growing segment of the natural gas industry uses $H_2S$ scavenging processes to remove low concentrations of $H_2S$ (usually less than about 100 ppm) from subquality natural gas at remote locations. For this gas segment, conventional amine sweetening is not economically feasible, particularly when carbon dioxide ($CO_2$) removal is not required. Historically, the natural gas production industry has used nonregenerable scavenging processes to treat this gas. In these processes, a scavenging agent reacts irreversibly with $H_2S$. The reaction products are subsequently separated from the treated sweet gas and discarded.

Hydrogen sulfide scavenging agents are most commonly applied through one of the following three methods: (1) batch application of liquid scavenging agents in a sparged tower contactor; (2) batch application of solid scavenging agents in a fixed-bed contactor; or (3) continuous direct injection of liquid scavenging agents. Studies of batch applications of liquid and solid scavenging agents have shown that scavenging chemical costs are lower for an iron-oxide-based solid scavenger than for an amine-based liquid scavenger. However, for natural gas with less than approximately 25 ppm $H_2S$, a direct-injection approach has the potential for the lowest overall costs because of its low capital cost relative to batch applications. Given the estimated $50 million per year in $H_2S$ scavenging chemical costs in the United States, significant cost savings are realizable from an $H_2S$ scavenging process utilizing continuous direct-injection of scavenging agents into the gaseous stream to be treated over conventional batch direct-injection scavenging applications.

Studies have been conducted which show that the performance of direct-injection scavenging systems is more difficult to predict than tower-based systems because the underlying fundamentals of direct injection are largely unknown. In addition, $H_2S$ removal results, chemical usage, and chemical costs are highly site-specific, especially with regard to gaseous fluid velocity, liquid-gas mixing conditions, and contact time.

SUMMARY OF THE INVENTION

It is one object of this invention to provide a method for removal of hydrogen sulfide from gaseous streams such as natural gas using chemical scavenging agents having improved $H_2S$ removal efficiency compared to conventional applications.

It is another object of this invention to provide a method for removal of hydrogen sulfide from gaseous streams employing direct-injection of scavenging agents into the gaseous stream to be treated which significantly reduces the amount of scavenging agent required for effective removal of $H_2S$ therefrom compared to conventional direct-injection methods.

These and other objects of this invention are achieved by a method for removal of $H_2S$ from an $H_2S$-containing gaseous stream in which a high surface area contactor is inserted into the gaseous stream flow and at least one $H_2S$ scavenging agent is injected into the gaseous stream upstream of the contactor or proximate an upstream portion of the contactor, whereby the $H_2S$ scavenging agent is distributed on at least one surface of the contactor. The $H_2S$ scavenging agent thus distributed on at least a portion of at least one surface of the contactor is contacted with the gaseous stream resulting in absorption of $H_2S$ into the $H_2S$ scavenging agent and reaction therewith, forming at least one byproduct, which byproduct is then removed from the gaseous stream.

More particularly, the invention is a method for removing small amounts of hydrogen sulfide from a gaseous stream utilizing a high-surface area contactor designed for gas treatment applications requiring the intimate contact of $H_2S$ scavenging agent liquids with the gas being treated for the purpose of removing $H_2S$ therefrom. The contactor is specifically designed for direct-injection applications whereby an $H_2S$ scavenging agent is injected directly into a pipeline through which the gaseous stream is flowing on a continuous basis upstream of a proximate or upstream portion of the contactor device. The mechanical features of the high-surface-area contactor may vary in design and include different approaches for achieving high surface areas. For example, closely-spaced parallel plates, knitted meshes, parallel banks of small diameter tubes, and certain types of structured packing, such as those normally used for mist eliminators, may all be used with this invention.

Compared to conventional methods and systems for removal of $H_2S$ from a gaseous stream utilizing $H_2S$ scavenging agent liquids, the method of this invention is advantageous in several ways. First, the surface area per unit volume of the contactor is much higher than a typical static mixer contactor or length of open pipe. Second, the invention design minimizes radial mixing compared to conventional static mixers which are designed to achieve a high degree of radial mixing. Third, the method of this invention minimizes re-entrainment of liquids compared to conventional static mixers which are designed to re-entrain and disperse liquid droplets. And, fourth, the method of this invention achieves mass transfer through the wetted surface area of the contactor surfaces compared to conventional static mixers which are designed to achieve mass transfer through the surface area of entrained droplets.

Conventional direct-injection $H_2S$ scavenging agent applications use an open pipeline as a contactor. In these applications, $H_2S$ scavenging agents, for example, aqueous formulations of 1, 3, 5 tri-(2-hydroxyethyl)-hexahydro-S-triazine, are injected into the gaseous stream where $H_2S$ is absorbed into the solution and reacted to form byproducts which are subsequently removed from the gaseous stream and discarded. To enhance mixing, static mixers have also been inserted into the pipeline to improve performance.

As previously indicated, two problems with the conventional approaches have plagued the industry, namely, insufficient removal of $H_2S$, and excessive use of chemical scavenging agents. The conventional methods rely upon dispersion of the scavenging agent into a large number of small droplets. The small droplets are necessary to create a large enough surface area for mass transfer and to facilitate the transport and mixing of the droplets with the gas being treated. The problems with this approach are that it is difficult to atomize small volumes of liquids, surface areas are often insufficient even with good atomization, and high gas flow rates are required to ensure that the droplets remain entrained in the gas. As a result, operators must inject large excesses of scavenging agent in an effort to improve $H_2S$ removal. The method of this invention overcomes these problems by providing surface area from the wetted surfaces of the contactor and not the surface area of the entrained droplets. That is, the amount of surface area available for absorption of the $H_2S$ from the surfaces of the contactor wetted by the chemical scavenging agents is substantially greater than the surface area of the entrained droplets in a conventional system.

The fundamental differences between the method of this invention and the conventional methods for direct-injection removal of $H_2S$ are as follows. Regarding surface area, conventional static mixers utilized in conventional direct-injection applications are designed primarily to mix different fluids together to produce a homogeneous fluid. However, this objective does not necessarily require a high wetted surface area. In contrast thereto, the method of this invention produces a much higher surface area for mass transfer. Table 1 shows a comparison of surface areas available for mass transfer using conventional direct-injection applications and surface areas generated by the method of this invention.

TABLE 1

Comparison of Example Surface Areas

| Example | Surface Area, $ft^2/ft^3$ |
|---|---|
| 2" Pipe | 24 |
| 8" Pipe | 8 |
| 16" Pipe | 4 |
| Conventional static mixer, 6" diameter, 1" crimp height | 22 |
| Conventional static mixer, 20" diameter, 3" crimp height | 7 |
| Liquid droplets dispersed in a gas stream, 25 micron Sauter mean diameter, and flowing at 30 ft/sec. With the gas, liquid injection rate of 2 gal/hour in a 6" pipe: | Less than 1 |
| Examples of the present invention: | |
| Bank of parallel horizontal plates, with 4 plates per inch: | 96 |
| Bank of parallel tubes, ⅜" O.D. and 0.049" wall thickness: | 200 |
| Knitted steel mesh, 9 lb/ft³ | 85 |

As clearly can be seen, the amount of surface area made available by the method of this invention is substantially larger than the surface area generated by conventional means.

Conventional static mixers utilized in conventional direct-injection applications are designed for high liquid loading rates, on the order of several gallons per minute. The method of this invention is designed specifically for the low liquid loading rates encountered in $H_2S$ scavenging applications. These liquid loadings are on the order of a few gallons per hour.

Finally, conventional methods rely on fine atomization of liquid droplets to generate a large surface area. In contrast thereto, the method of certain embodiments of the present invention does not rely on fine atomization of liquid, but rather relies on even distribution of the scavenging liquid on the face of a contactor inlet. Even distribution can be achieved with coarser atomization, thereby allowing turn-down to lower flow rates and resulting in fewer mechanical problems associated with trying to achieve fine atomization, for example, nozzle plugging.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

In the method of this invention for removal of $H_2S$ from an $H_2S$-containing natural gas stream, a high surface area contactor is inserted into the natural gas stream and at least one $H_2S$ scavenging agent is injected into the natural gas stream upstream of or proximate an upstream portion of the high surface area contactor so that the at least one $H_2S$ scavenging agent is distributed on at least a portion of at least one surface of the high surface area contactor. Suitable $H_2S$-scavenging agents for use in the method of this invention include, but are not limited to, GAS TREAT® 136 and GAS TREAT® 155 available from Champion Technologies, Inc., SULFURID® 8411 available from Edmunds and Associates, Inc., Quaker ENVIRO-TEK™ available from Quaker Chemical Corporation, DM-5927 available from Betz Dearborn, Nalco/Exxon EC-5492A available from Nalco/Exxon Energy Chemicals, L.P., and SULFA-SCRUB® HSW-700L available from Baker-Petrolite. The distributed $H_2S$ scavenging agent is then contacted by the natural gas stream flowing past the contactor resulting in absorption of $H_2S$ into the $H_2S$ scavenging agent and reaction therewith, forming at least one byproduct. The byproducts thus formed are removed from the natural gas stream by conventional means.

Figure 1:
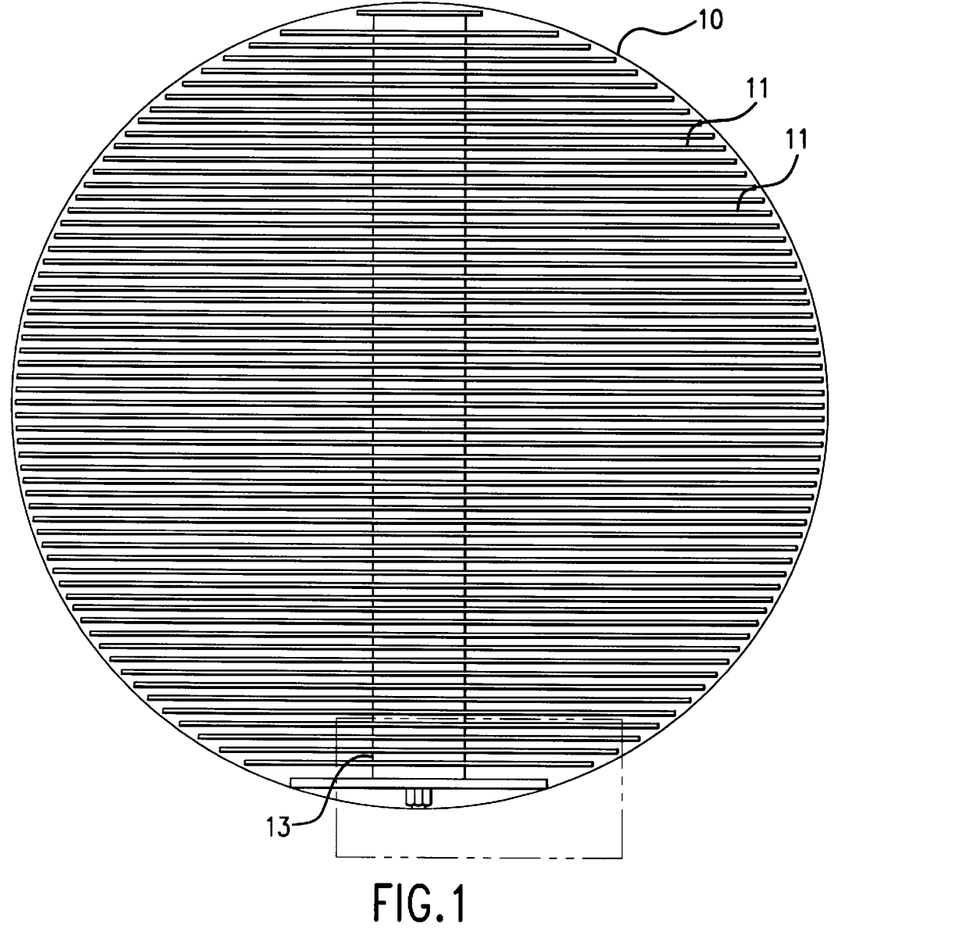
FIG. 1 is a transverse view of a pipe with a contactor disposed therein in accordance with one embodiment of a contactor suitable for use in the method of this invention.
Figure 1A:
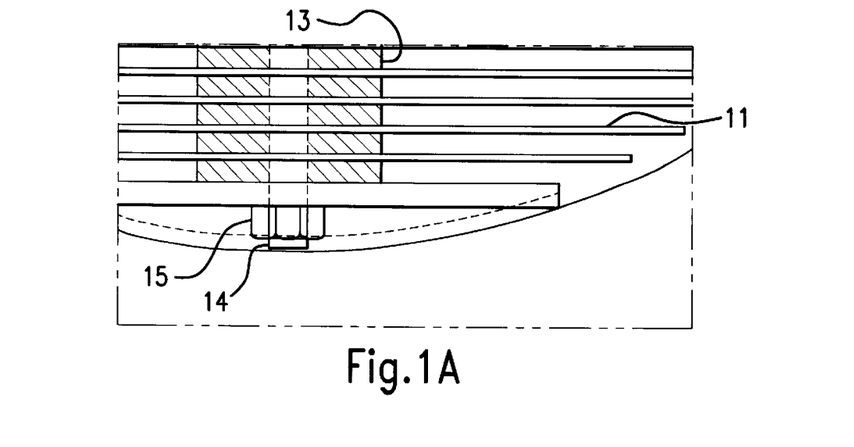

FIG. 1 shows an elevation view of a high surface area contactor designed to fit inside a natural gas pipe 10, which high surface area contactor comprises a plurality of horizontal parallel plates 11. Horizontal parallel plates 11 are spaced apart from one another by plate separators 13 disposed between each of horizontal parallel plates 11. Horizontal parallel plates 11 and plate separators 13 are held together as a single unit by bolt 14 extending through each of horizontal parallel plates 11 and plate separators 13 and secured by nut 15, as shown in FIG. 1a. $H_2S$ scavenging agent is then introduced into pipe 10 from an injection nozzle located upstream of high surface area contactor plates 11 at a distance suitable for distributing the liquid evenly on the inlet face of horizontal parallel plates 11.

Figure 2:
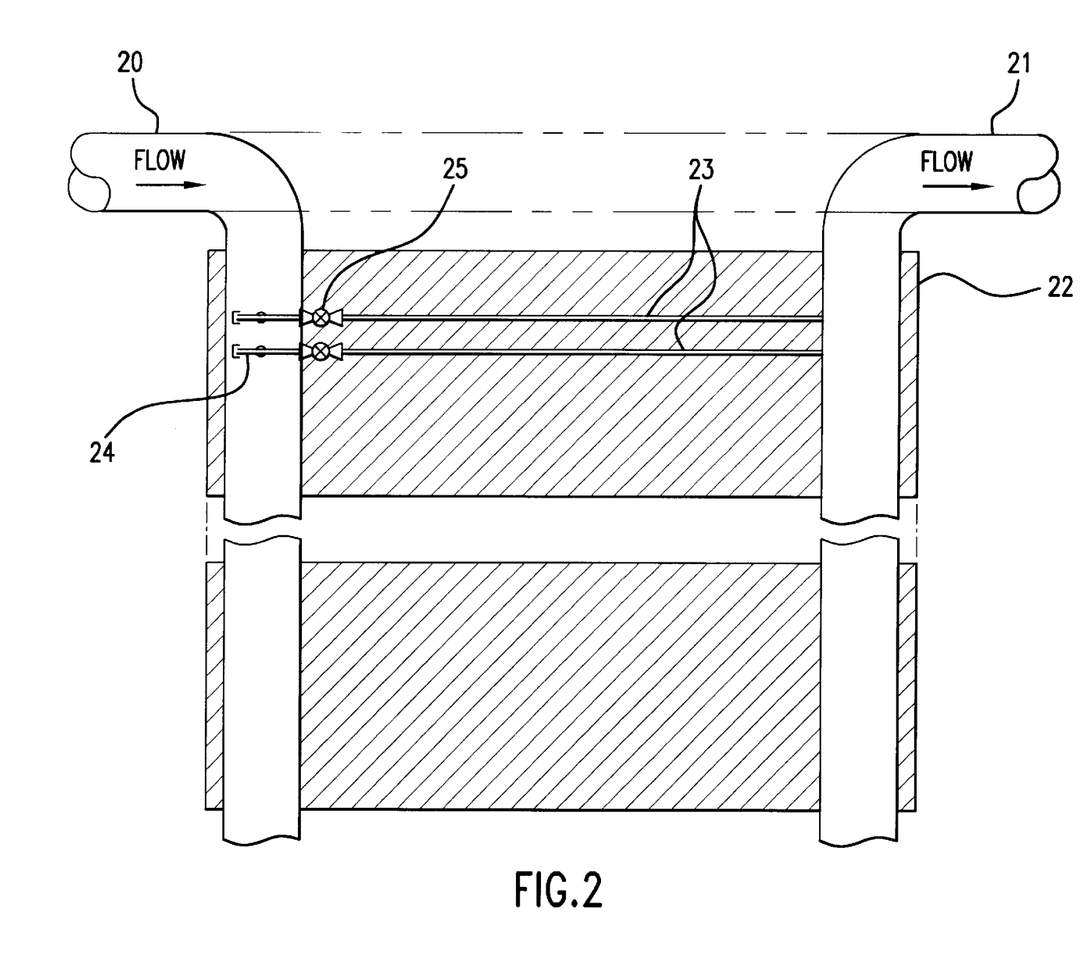
FIG. 2 is a plan view of parallel pipe contactors suitable for use in the method of this invention.
Figure 3:
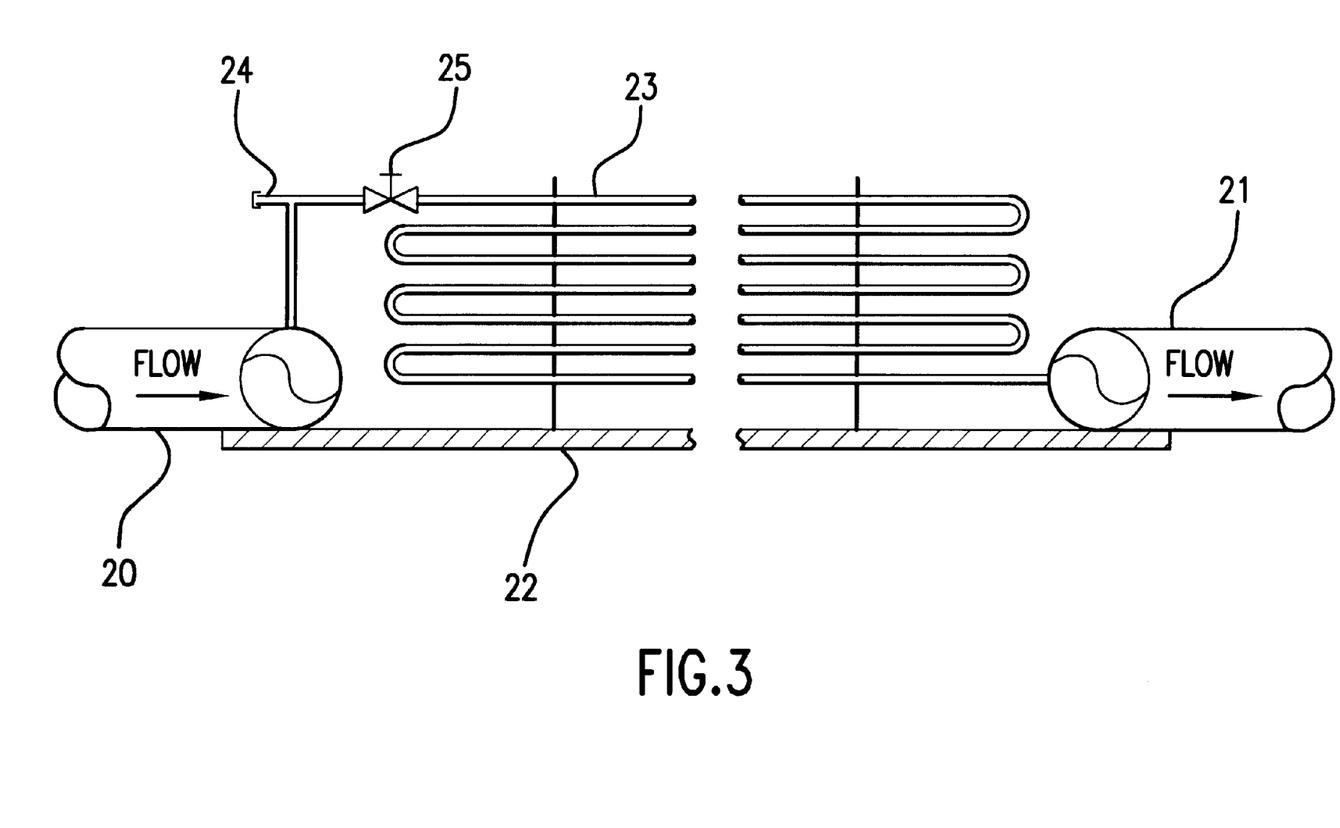
FIG. 3 is a side view of a parallel pipe contactor skid assembly suitable for use in the method of this invention.

In accordance with a particularly preferred embodiment of this invention, the high surface area contactor is a parallel pipe contactor as shown in FIGS. 2 and 3. In the embodiments shown in FIGS. 2 and 3, natural gas from a natural gas inlet header 20 flows through a plurality of parallel contactor pipes 23 and out through natural gas outlet header 21. Flow through individual contactor pipes 23 is controlled by gas flow control valves 25 disposed proximate the inlet end of the contactor pipes 23. This arrangement provides for high surface area contact from the large number of small diameter contactor pipes 23 while allowing operation over a large range of flows. Gas flow control valves 25 are opened or closed as necessary to maintain a constant flow of natural gas through each contactor pipe 23. $H_2S$ scavenging agent is then introduced into each contactor pipe 23 through which natural gas is flowing at scavenging agent inlet end 24 of contactor pipe 23, which scavenging agent inlet end is disposed upstream of gas flow control valve 25. Although shown as being injected upstream of contactor pipe 23, injection directly into contactor pipe 23 of the scavenging agent proximate the upstream end thereof is also deemed to be within the scope of this invention. This embodiment of a contactor enables high gas velocities, high $H_2S$ removal efficiencies, and efficient chemical usage at low gas flow rates. As shown in FIGS. 2 and 3, the parallel pipe contactors may be disposed on skids 22.

Compared to conventional static mixer contactors or lengths of open pipe, the surface area per unit volume of the contactors used in the method of this invention is substantially higher. Conventional static mixers are designed primarily to mix different fluids together to produce a homogeneous fluid. This objective does not necessarily require a high wetted surface area. In contrast thereto, the high surface area contactors suitable for use in the method of this invention provide much higher surface areas for mass transfer.

Finally, in contrast to conventional static mixers which are designed for high liquid loading rates, on the order of several gallons per minute, the high surface area contactors suitable for use in the method of this invention are designed specifically for the low liquid loading rates encountered in $H_2S$ scavenging applications. These liquid loadings are on the order of a few gallons per hour.

In order to develop a basic understanding of the fundamental behavior of direct-injection $H_2S$ scavenging in accordance with the method of this invention, tests were conducted using a triazine scavenging agent (Baker-Petrolite's SULFA-SCRUB® HSW 700L). The results of the tests show that the velocity of the natural gas flowing through the pipe has a large effect on the mass transfer coefficient and $H_2S$ removal efficiency. Overall, $H_2S$ removal efficiency increased with increasing gas velocity over the range of conditions studied.

Test results also show that greater $H_2S$ removal occurred in a two-inch diameter test loop than in a six-inch diameter test loop for equivalent gas flow velocities, pipe lengths, and contact times. For example, approximately 66% $H_2S$ removal occurred in the six-inch pipe, whereas 86% $H_2S$ removal occurred in the two-inch pipe under the same gas velocity and liquid/gas ratio. In accordance with a preferred embodiment of the method of this invention, the preferred high surface area contactor is the parallel pipe contactor shown in FIGS. 2 and 3.

Regarding scavenger agent injection rate, the tests showed that the scavenger injection rate had a marked effect on $H_2S$ removal efficiency. At higher gas velocities, increasing the scavenger injection rate caused a dramatic increase in $H_2S$ removal. The effect was less significant at very low gas velocities.

Figure 4:
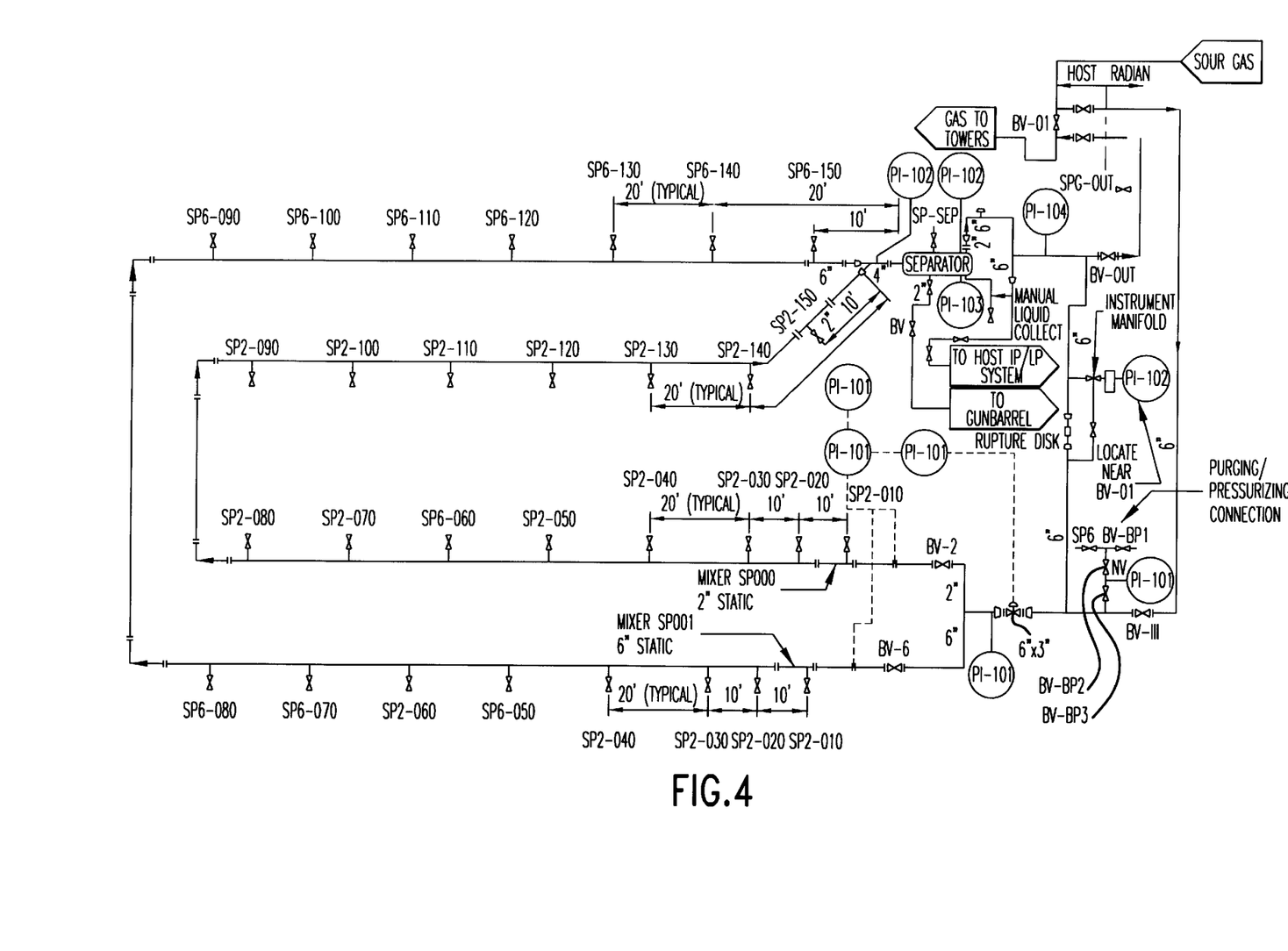
FIG. 4 shows a process flow diagram of a test loop employed in the evaluation of the method of this invention.

FIG. 4 shows a process flow diagram of a test loop employed in the testing of the method of this invention. The test loop consisted of 250 feet (each) of six-inch and two-inch diameter carbon steel pipe. Sampling and injection ports were located every 20 feet along the loop. Each sampling port consisted of a ¼-inch stainless steel sampling quill inserted into the middle third of the pipe, in accordance with ASTM D 4810-88. The test loop gradually sloped downward (six inches in 250 feet) to prevent slugs of liquids from accumulating. A three-inch, automatic control valve regulated the flow of gas through the system.

Figure 5:
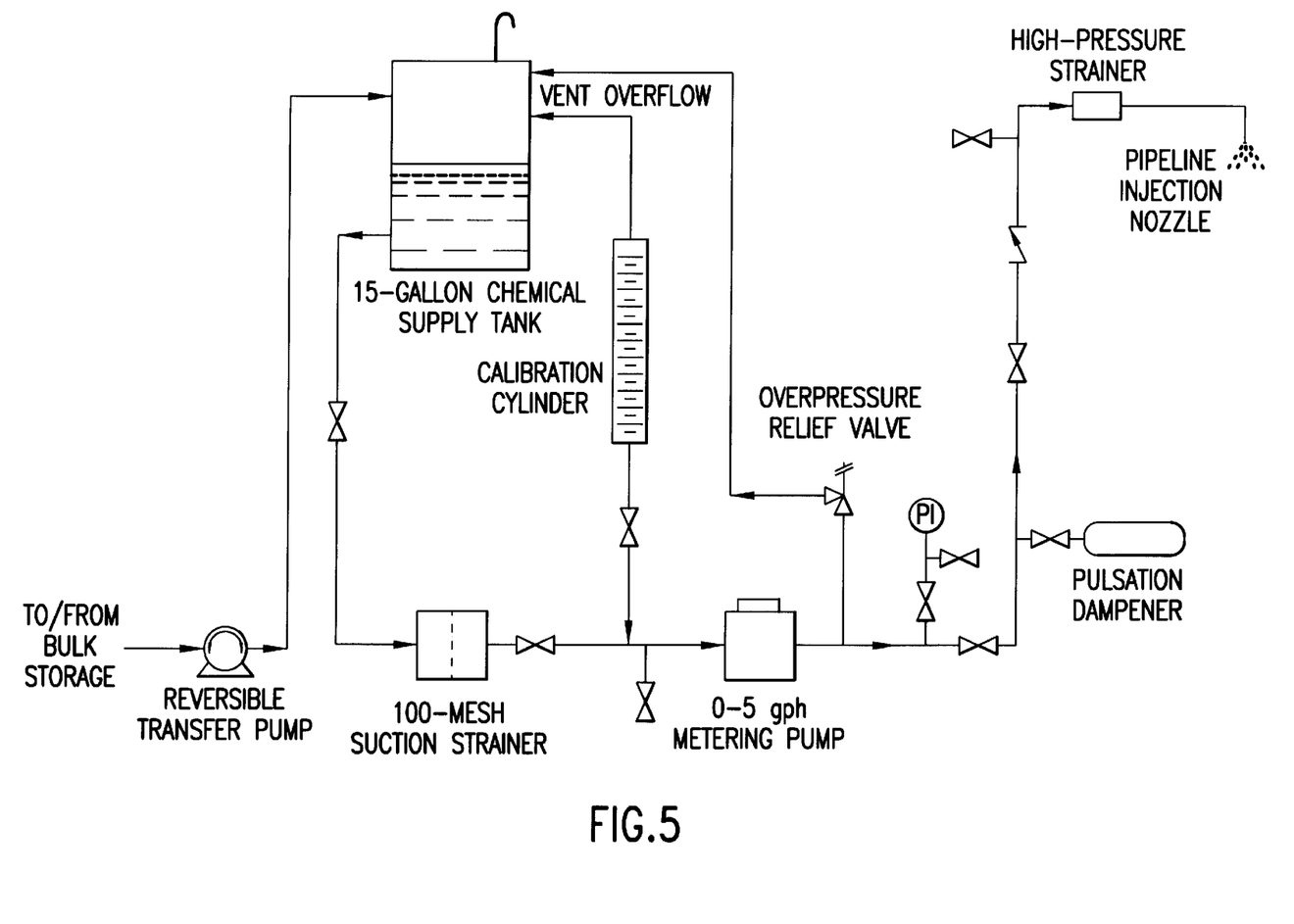
FIG. 5 is a flow diagram of the chemical metering and injection system used with the test loop shown in FIG. 4.

Scavenging agent was pumped from a 15-gallon supply tank into the test loop using a high-pressure, duplex, single-acting plunger pump. FIG. 5 is a flow diagram of the chemical metering and injection system. The scavenger flow rate was measured periodically with a graduated cylinder installed on the pump's suction line. An outlet separator at the end of the test loop collected spent scavenging agents, condensed hydrocarbons, and condensed water. The separator was 30 inches in diameter and 10 feet long, and contained a steel-mesh mist extractor. Sampling ports were installed at the separator, both upstream and downstream of the mist extractor pad.

Atomization nozzles manufactured by Bete Fog Nozzle, Inc., of Greenfield, Mass. were used during testing. A different nozzle was used for each scavenger injection rate to control atomization and maintain a constant pressure drop across the nozzle. This approach allowed the scavenger injection rate to be varied while holding the nozzle pressure drop constant.

Table 2 shows the range of operating conditions over which data were collected.

TABLE 2

Direct-Injection Test Loop Operating Conditions

| Item | Range 2-Inch Pipe | Range 6-Inch Pipe |
|---|---|---|
| Gas flow rate | 0.6–6.0 MMscfd | 3–30 MMscfd |
| Gas velocity | 5–50 ft/sec | 3–30 ft/sec |
| Gas/liquid contact time | 5–50 seconds (with return piping) | 8–80 seconds (with return piping) |
| Test loop pressure drop | 0–30 psig | 0–5 psig |
| Temperature | 70–120° F. | 70–120° F. |
| Pressure | 950–1050 psig | 950–1050 psig |
| Scavenging agent | SULFA-SCRUB ® HSW 700L | SULFA-SCRUB ® HSW 700L |
| Scavenger injection rate | 0.020–0.60 gph | 0.10–3.5 gph |

For the six-inch pipe, gas velocities ranged from three feet per second to 30 feet per second. For the two-inch pipe, the corresponding gas velocities were five feet per second to 50 feet per second. Scavenger injection rates ranged from 0.50 gallons/MMscf to 6.0 gallons per MMscf. These ranges of gas velocities and liquid/gas ratios are typical for direct-injection scavenging applications.

Process data were collected after the test loop reached a steady state for each set of operating conditions. Initial tests showed that steady state could be reached after approximately 30 minutes, as indicated by relatively constant $H_2S$ concentrations in the treated gas. Table 3 lists the process data collected during these tests.

TABLE 3

Data Collection

| Item | Method | Frequency |
|---|---|---|
| Inlet gas flow | Differential pressure across orifice meter | Chart recorder |
| Total gas flow | Host metering system | 2/hour |
| Inlet and outlet gas pressure | Pressure gauge | 2/hour |
| Inlet and outlet gas temperature | Dial thermometer | 2/hour |
| Separator liquid level | Level gauge | 2/hour |
| Scavenger injection rate | Dial setting, tank gauge | 2/hour |
| Nozzle pressure drop | Pressure gauge | 2/hour |
| $C_1$—$C_6$, $N_2$ and $CO_2$ | Contract laboratory | Once |
| $H_2S$ concentration profile along test loop | Stain tubes and GC | 2/hour |
| Inlet gas $H_2O$ and $CO_2$ concentration | Stain tubes | 1/day |
| Fresh and spent scavenger composition | Total Kjehldahl nitrogen; total suspended solids | 1/week 1/week |
| Solids buildup in pipe | Visual inspection of pipe internals | Once |

The test loop was fully attended during operation; all data except the natural gas flow rate were recorded manually from gauges. The natural gas flow rate was controlled and recorded with a flow meter, flow controller, and chart recorder. The $H_2S$ concentration of the natural gas samples was measured using stain tubes, with periodic analysis by gas chromatograph to identify and correct any bias in the stain tube results.

Average mass transfer coefficients, expressed as $K_g a$ values, were calculated from the following simplified equation for estimating the absorption of $H_2S$ from natural gas:

$$\frac{(K_g a)P}{G} Z = \ln\left(\frac{y_i}{y_o}\right) \quad (1)$$

Where:

$K_g$=Mass transfer coefficient, lb mol/(h atm ft$^2$)
a=Interfacial area, ft$^2$/ft$^3$
P=Pressure, atm
Z=Pipe length, ft
G=Gas molar mass velocity, lb mol/(h ft$^2$)
$y_i$=Inlet $H_2S$ mole fraction
$y_o$=Outlet $H_2S$ mole fraction This equation is derived based on an ideal model which assumes that the equilibrium vapor pressure of $H_2S$ is zero, and that the $K_g a$ value remains constant along the length of the pipe. Test data, however, show that the $K_g a$ value does in fact change (it decreases) along the length of pipe and the vapor pressure of $H_2S$ does eventually rise as the stoichiometric limit of the scavenging agent is approached. Despite the limitations of the idealized model, Equation 1 provides estimates of the average $K_g a$ value and can be used successfully to predict $H_2S$ removal over the wide range of flow conditions studied during the Phase I testing.

In Equation 1, the height (length) of a transfer unit (HTU) and number of transfer units (NTU) are defined as:

$$NTU = \ln\left(\frac{y_i}{y_o}\right) \quad (2)$$

$$HTU = \frac{G}{(K_g a)P} \quad (3)$$

Equation 1 was used to calculate average mass transfer coefficients for three pipe lengths: 40 ft, 120 ft, and 240 ft. For example, the inlet $H_2S$ concentration, along with the $H_2S$ measured 40 ft downstream of the injection point was used to calculate the average $K_g a$ value for the 40 ft segment of pipe. The average for the 0–120 ft and 0–240 ft pipe lengths were calculated similarly.

The data were regressed using standard statistical methods to find the best fitting coefficients for the following equation:

$$K_g a = C_1 G^{C_2} (L/G)^{C_3} D^{C_4} \quad (4)$$

Where:

$K_g a$=Mass transfer coefficient, lb mol/(h atm ft$^3$)
G=Gas molar mass velocity, lb mol/(h ft$^2$)
L/G=Liquid/gas ratio, gallons/MMscf
D=Pipe diameter, inches
$C_1$, $C_2$, $C_3$, $C_4$=Regression coefficients Equation 4 is a dimensional equation, i.e., the data must be entered in the correct units as shown. Regression coefficients were developed for each of the three sampling locations: 40 ft, 120 ft, and 240 ft downstream of the injection point. The regression coefficient results are presented hereinbelow.

Table 4 hereinbelow shows the results of three baseline tests which were designed to provide a benchmark operating condition for comparison to other test conditions.

TABLE 4

Summary of Results from 6-inch and 2-inch Baseline Tests

| Pipe Size (inch) | Gas Flow (MMscfd) | Scavenger Injection Rate (gph) | Test No. | Date | Nozzle Type | $H_2S$ (ppm) Inlet | $H_2S$ (ppm) 240 ft | Percent $H_2S$ Removal | $K_g a$ at 240 ft lb mol/ (h atm ft$^3$) |
|---|---|---|---|---|---|---|---|---|---|
| 6 | 10 | 1.08 | B-1 | 7/3/97 | PJ-8 | 9.9 | 6.0 | 31.7 | 0.14 |
|   |    |      | B-4 | 8/4/97 | PJ-8 | 10.7 | 6.6 | 38.1 | 0.17 |
|   |    |      | B-7 | 9/4/97 | PJ-8 | 10.2 | 6.9 | 40.0 | 0.17 |
|   |    |      |     |        | Average | 10.3 | 6.5 | 36.6 | 0.16 |
| 6 | 30 | 1.08 | B-2 | 7/3/97 | PJ-8 | 9.1 | 3.8 | 58.3 | 0.87 |
|   |    |      | B-5 | 8/4/97 | PJ-8 | 9.9 | 4.9 | 50.8 | 0.77 |
|   |    |      | B-8 | 9/4/97 | PJ-8 | 11.6 | 4.8 | 58.4 | 0.90 |
|   |    |      |     |        | Average | 10.2 | 4.5 | 55.8 | 0.85 |
| 2 | 3  | 0.20 | B-3 | 7/8/97 | None | 11.1 | 0.77 | 86.2 | 2.07 |
|   |    |      | B-6 | 8/4/97 | None | 9.7 | 0.53 | 94.5 | 2.75 |
|   |    |      | B-9 | 9/4/97 | None | 8.2 | 1.1 | 93.1 | 2.45 |
|   |    |      |     |        | Average | 9.7 | 0.80 | 91.3 | 2.42 |

The baseline test results show that test conditions and results were reasonably duplicated throughout the test period and that no significant trends or drifts in results were observed. The baseline tests also show the amount of variability in test results.

Figure 6:
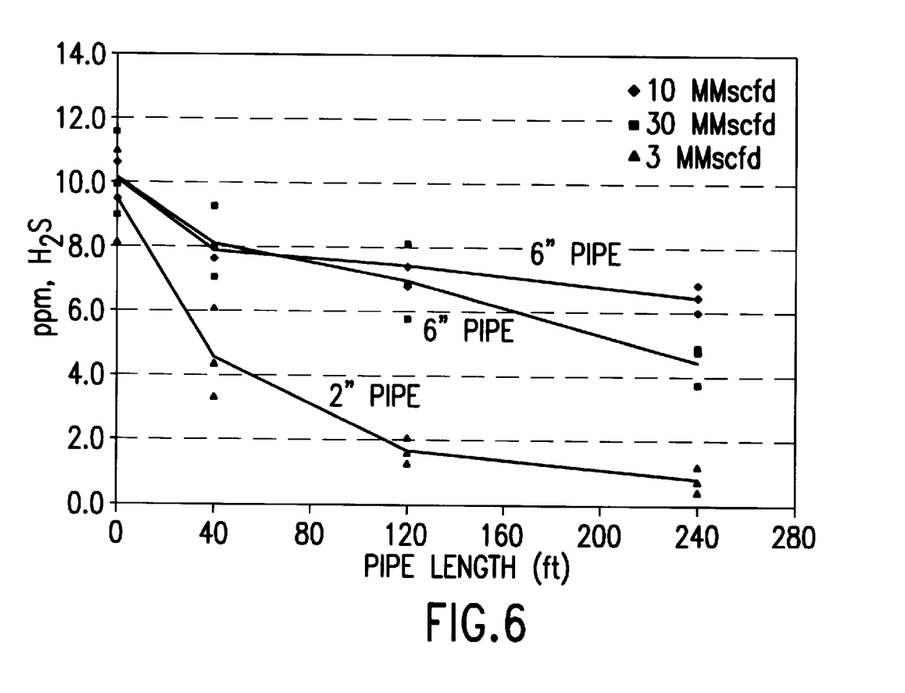
FIG. 6 is a diagram showing the concentration of $H_2S$ in natural gas as a function of distance down the pipe from the point of scavenging agent injection.

FIG. 6 shows the concentration of $H_2S$ in the natural gas as a function of distance down the pipe for the baseline tests. Natural gas samples were collected at the inlet to the test loop, and at 40 feet, 120 feet, and 240 feet downstream of the injection point. Close examination of Equation 1 hereinabove reveals that the $H_2S$ concentration in the gas ($y_o$) tends to follow an exponential decay as a mixture of gas and scavenging agent flows down the pipe (as long as all other factors remain constant):

$$y_o = y_i \exp\left(\frac{P(K_g a)Z}{G}\right) \quad (5)$$

Equations 1 and 2 also show that for a constant mass transfer term ($K_g a$), the number of transfer units is proportional to the length of pipe divided by the gas velocity, or, equivalently, the gas/liquid contact time.

A series of tests was conducted to investigate the role of atomization and its effect on the $H_2S$ scavenging process. The first tests measured the effect of different nozzle orientations within the pipe. The next set of tests examined the importance of maintaining a constant flow rate across the nozzle (as opposed to a pulsed flow that is commonly generated with typical scavenger injection pumps). The effect of atomization is measured by comparing results to those obtained by simply dripping the scavenger into the pipe through an open ¼-inch tube. The results of these tests are described in the following paragraphs.

Three different nozzle orientations were tested to determine whether the orientation made a significant difference in the results. The orientations were: (1) nozzle located in the middle of the pipe, spraying horizontally downstream with the gas flow; (2) nozzle located in the middle of the pipe, spraying horizontally upstream against the gas flow; and (3) nozzle located at the top of the pipe, spraying down across the flow of gas. The results of these tests are given in Table 5.

TABLE 5

Effect of Nozzle Orientation (6-inch pipe)

| Gas Flow (MMscfd) | Scavenger Injection Rate (gph) | Nozzle Orientation | $H_2S$ (ppm) Inlet | $H_2S$ (ppm) 40 ft | $H_2S$ (ppm) 240 ft | Percent $H_2S$ Removal 40 ft | Percent $H_2S$ Removal 240 ft |
|---|---|---|---|---|---|---|---|
| 10 | 1.08 | Downstream | 10.2 | 7.9 | 6.9 | 22.5 | 32.4 |
|    |      | Upstream | 9.8 | 7.7 | 6.6 | 21.4 | 32.7 |
|    |      | Vertical, down | 11.1 | 8.5 | 6.5 | 23.4 | 41.4 |
| 30 | 1.08 | Downstream | 11.6 | 9.3 | 4.8 | 19.8 | 58.6 |
|    |      | Upstream | 10.4 | 8.9 | 5.2 | 14.4 | 50.0 |
|    |      | Vertical, down | 12.5 | 9.5 | 8.4 | 24.0 | 32.8 |

The test results suggest that the effect of nozzle orientation, if any, is small under these test conditions and cannot be measured accurately given the position of the test loop measurements. It is possible, however, that the nozzle orientation is important under other operating conditions, such as for large diameter pipes, very low gas velocities, or when injecting at the entrance to a static mixer. For all other tests, the injection nozzle is located in the center of the pipeline and sprayed horizontally, cocurrent with the gas flow.

Several tests were conducted to measure the effect of maintaining a constant flow through the nozzle (by using a pulsation dampener) on $H_2S$ removal. The results of these tests are presented in Table 6.

TABLE 6

Effect of Pulsation Dampening (6-inch pipe)

| Gas Flow (MMscfd) | Scavenger Injection Rate (gph) | Pulsation Dampening | Nozzle dP (psig) | H$_2$S (ppm) Inlet | H$_2$S (ppm) 240 ft | Percent H$_2$S Removal | K$_g$a at 240 ft lb mol/ (h atm ft$^3$) |
|---|---|---|---|---|---|---|---|
| 10 | 1.08 | On | 142 | 7.2 | 5.1 | 29.0 | 0.11 |
|  |  | Off | 82–200 | 7.6 | 4.8 | 36.4 | 0.16 |
| 30 | 1.08 | On | 149 | 9.2 | 3.7 | 54.5 | 0.79 |
|  |  | Off | 28–136 | 10.4 | 4.2 | 54.5 | 0.79 |
| 3 | 0.60 | On | 166 | 9.4 | 6.3 | 33.0 | 0.038 |
|  |  | Off | 176–191 | 8.8 | 6.2 | 29.2 | 0.034 |

The positive displacement pumps commonly used for direct-injection scavenging applications produce a pulsed flow of scavenging agent. Between pulses, the gas could potentially flow past the injection area without being treated. In addition, because the pressure drop across the atomization nozzle may be low for part of the cycle, the scavenging agent may not be properly atomized. Pulsation dampeners serve to smooth out these variations in flow rate and pressure drop across the nozzle. The single-acting, two-plunger pump used for these tests produced a pulsed flow of 70 or 140 strokes per minute, depending on whether the pump was operated in simplex (one plunger) or duplex (two plungers) configuration.

The effect of pulsation dampening on H$_2$S removal was too small to be accurately measured for the test conditions studied. One reason for this result may have been that the approximately 100 feet of tubing from the injection pump to the atomization nozzle provided some dampening of flow, as indicated by the nozzle pressure drop data shown in Table 6. However, the pulsation dampener was used for all other tests to help maintain a constant pressure drop across the injection nozzle. This approach allowed isolation of more important process variables such as gas velocity and L/G ratio. Pulsation dampening may produce a greater effect under other conditions, such as low pump stroke frequency or very short lengths of injection tubing.

Table 7 shows the results of a series of tests conducted with and without an injection nozzle to atomize the liquid scavenging agent.

TABLE 7

Effect of Nozzle on H$_2$S Removal (6-inch pipe)

| Nozzle | Test No. | Gas Flow (MMscfd) | Scavenger Injection Rate (gph) | Percent H$_2$S Removal 40 ft | Percent H$_2$S Removal 240 ft | K$_g$a at 240 ft lb mol/ (h atm ft$^3$) |
|---|---|---|---|---|---|---|
| PJ-8 | 6-1 | 9.8 | 1.04 | 22.7 | 29.0 | 0.11 |
| None | 6-22 | 9.7 | 1.07 | 0.0 | 24.2 | 0.089 |
| PJ-8 | 6-2 | 14.8 | 1.06 | 39.4 | 42.5 | 0.28 |
| None | 6-23 | 15.0 | 1.07 | 3.3 | 22.5 | 0.13 |
| PJ-8 | 6-3 | 21.8 | 1.08 | 36.3 | 29.1 | 0.26 |
| None | 6-24 | 22.3 | 1.07 | 20.0 | 43.6 | 0.46 |
| PJ-8 | 6-4 | 30.6 | 1.06 | 27.0 | 54.5 | 0.79 |
| None | 6-24A | 30.6 | 1.07 | 14.9 | 50.5 | 0.75 |

The results improved for some of the tests at the sampling point 240 feet downstream of the injection location. However, H$_2$S removal was significantly better for all tests at the 40 foot location when the atomization nozzle was used. The enhanced H$_2$S removal was most significant at lower gas flow rates where the gas and liquid are more prone to stratified flow (and, thus, poorer mixing). These results suggest that atomization becomes more important as the pipe length decreases.

Figure 7:
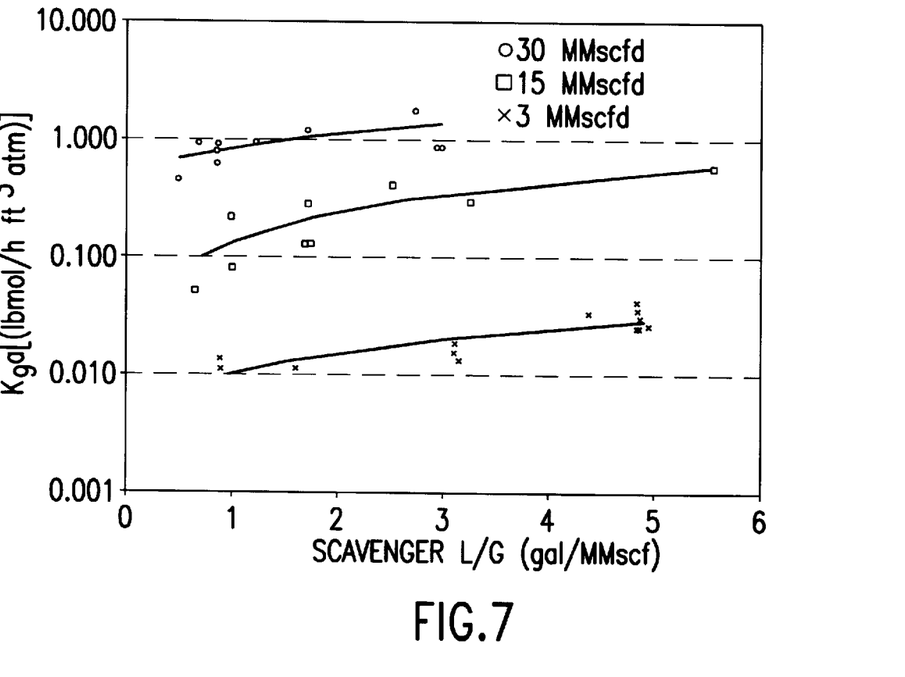
FIGS. 7 and 8 provide a summary of parametric test results for a six-inch pipe and a two-inch pipe, respectively.
Figure 8:
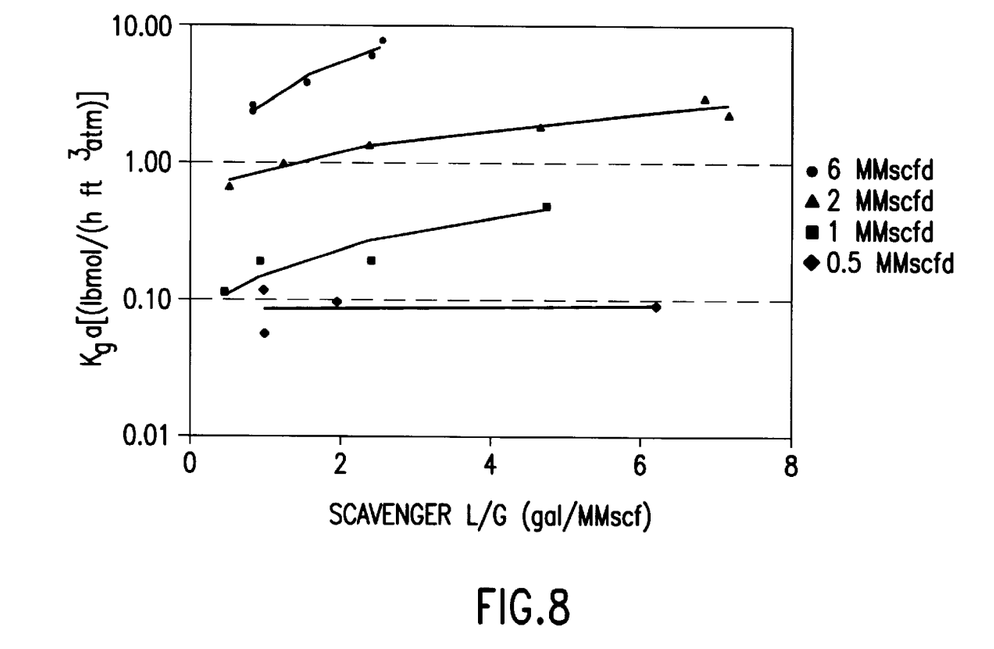

The majority of testing involved parametric tests over a wide range of gas flow rates and chemical injection rates to determine the effect of these variables on H$_2$S removal. FIGS. 7 and 8 provide a summary of the test results for the six-inch pipe and two-inch pipe, respectively. The results are expressed in terms of the average overall mass transfer coefficient, K$_g$a, calculated from the inlet H$_2$S concentration and the concentration 240 feet downstream of the injection point.

The chemical injection rate, expressed at the L/G ratio, produced a strong effect on the mass transfer coefficient for most test conditions. FIGS. 7 and 8 show that for a given gas flow rate, increasing the chemical injection rate (or L/G ratio) results in an increase in the overall mass transfer coefficient (K$_g$a). The H$_2$S removal efficiency also increases with higher L/G ratios. As shown in the figures, this effect is strongest at the higher gas flow rates.

FIGS. 7 and 8 also show the effect of gas flow rate on the mass transfer coefficient. For a constant L/G ratio, the mass transfer coefficient is higher at higher gas flow rates. FIG. 7 shows that the mass transfer coefficient for tests run at 30 MMscfd is nearly two orders of magnitude higher than that for tests conducted at 3 MMscfd. The strong dependence suggests that the flow of the scavenging agent may be different for these two gas flow rates, that is stratified flow at 3 MMscfd versus spray-mist flow at 30 MMscfd.

The difference in results between the six-inch pipe loop (FIG. 7) and the two-inch pipe loop (FIG. 8) indicates the effect of pipe diameter. For a given gas flow velocity and L/G ratio, the mass transfer coefficient, and consequently, the percent H$_2$S removal, was significantly higher for the two-inch pipe. The increased removal in the two-inch pipe results from the availability of a larger wetted surface area for mass transfer per unit volume of pipe.

The data which we collected were correlated using standard multiple linear regression techniques. The resulting equations developed can be used to predict K$_g$a and the consequent H$_2$S removal efficiency for the test loop over the full range of liquid and gas flow rates and pipe diameters. These data were correlated over the range of conditions given in Table 8.

TABLE 8

Range of Conditions Included in the Linear Regression Model

| Variable | Minimum Value | Maximum Value |
|---|---|---|
| Gas molar mass velocity, lb mol/(h ft$^2$) | 1800 | 33,000 |
| L/G ratio, gallons/MMscf | 0.3 | 7.2 |
| Pipe diameter, inches | 1.939 (2" schedule 80) | 5.761 (6" schedule 80) |
| Gas Pressure, psig | 940 | 1200 |
| Gas Temperature, °F. | 94 | 116 |
| Inlet H$_2$S concentration | 6.9 | 13.3 |

Table 9 shows the regression parameters for each of the equations along with the R-squared values and mean-squared error of the individual predictions of the $K_g a$ values. Because the data were transformed by taking their natural logarithms prior to regressing, the mean-squared error represents the error in predicting the natural logarithm of the $K_g a$ value.

TABLE 9

Linear Regression Model Parameters

| Pipe Segment | Regression Coefficients | | | | R-Squared | Mean Squared Error |
|---|---|---|---|---|---|---|
| | $C_1$ | $C_2$ | $C_3$ | $C_4$ | | |
| 0–40 ft | 2.80E-08 | 1.92 | 0.782 | −0.505 | 0.91 | 0.54 |
| 0–120 ft | 4.83E-08 | 1.85 | 0.749 | −0.842 | 0.94 | 0.45 |
| 0.240 ft | 5.09E-08 | 1.82 | 0.676 | −0.881 | 0.95 | 0.39 |

Figure 9:
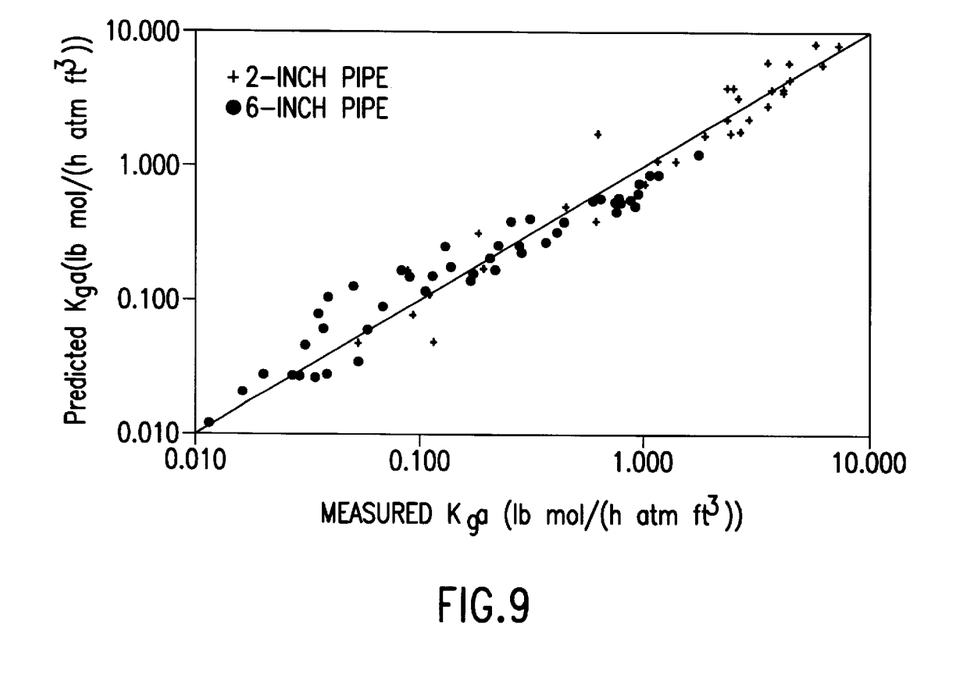
FIG. 9 shows the $K_g a$ values predicted from calculations versus measured $K_g a$ values.

FIG. 9 shows a graph of the $K_g a$ values predicted using Equation (4) versus the measured $K_g a$ values for the 240 foot sampling location. Both the two-inch and six-inch data are shown in this figure. This graph shows that the regression equation makes reasonable predictions of $K_g a$ over the range of values of $K_g a$ values that spanned approximately three orders of magnitude. An example calculation of $K_g a$ and the associated H$_2$S removal efficiency is provided hereinbelow.

Static mixer testing was conducted at the six-inch diameter test loop at flow rates of 3, 10, and 30 MMscfd. For each flow rate, the scavenger injection rate was varied from approximately 0.5 gallons per MMscf to 5 gallons per MMscf. The scavenging agent was injected approximately 15 inches upstream from the mixer. For most of the tests, an atomization nozzle was used to spray the agent horizontally downstream toward the mixer elements. For tests conducted with less than 0.6 GPH, an atomization nozzle was not used because, for these low flow rates, the smallest nozzles available were still too large. During each test, which lasted about two hours, samples of natural gas were collected and analyzed from the inlet, and from sample points located 10 feet, 40 feet, 120 feet, and 240 feet downstream from the point of injection.

Figure 10:
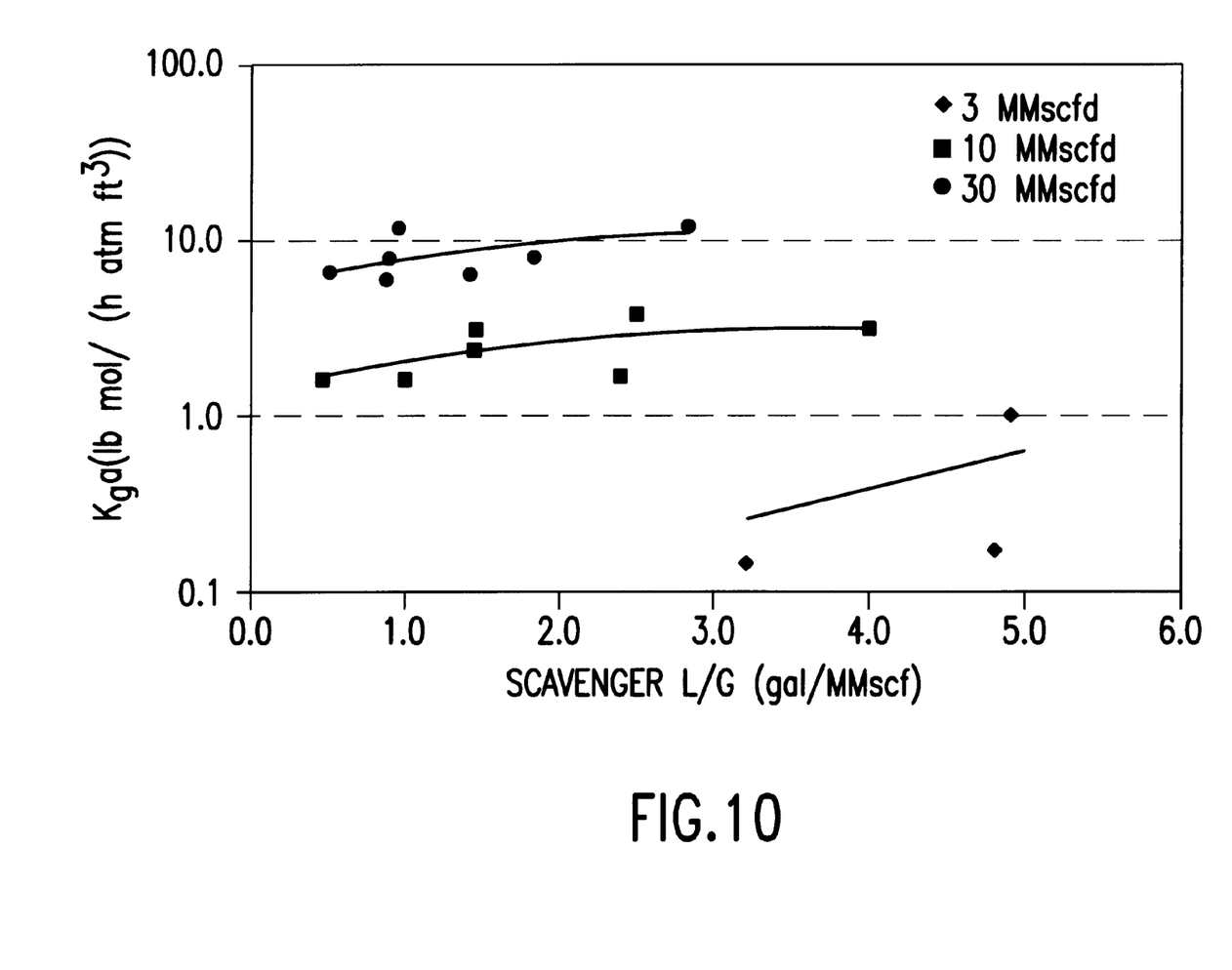
FIG. 10 summarizes the results of tests employing a static mixer.

FIG. 10, which summarizes the results from the static mixer test, shows the average $K_g a$ values based on samples collected 10 feet downstream of the injection point for each of the three nominal flow rate test series. The results show the same trends that were seen with injection into an open pipe, that is, the mass transfer coefficient depending strongly on the gas flow rate, and to a lesser extent on the liquid injection rate.

Data collected from tests conducted with and without the static mixer element at test conditions of 3 and 30 MMscfd were not significantly different. However, at 10 MMscfd, there was a measurable improvement, especially at lower L/G ratios. Nevertheless, despite some marginal improvement, the static mixer did not reduce H$_2$S levels to below 4 PPM.

These results suggest that a mechanism other than mixing is controlling the H$_2$S removal. Without wishing to limit the scope of the invention claimed herein, one possible explanation is that mass transfer under these conditions is controlled largely by the interfacial surface area between the scavenging agent and the gas. At the low liquid loading rates encountered in H$_2$S scavenging, most of the surface area is believed to be provided by the wetted surfaces of the pipe, not from the surface area of the droplets themselves. As a result, the improvement in $K_g a$ would be limited to the increase in surface area provided by the mixing element surfaces. This idealized model suggests that the $K_g a$ measured at the 40 foot level would only be about 20–30% higher using the static mixer, based on the estimated surface area of the mixer and the interior surface area of the pipe.

Table 10 shows the results of three tests that were conducted with the scavenging agent diluted to 31 volume percent with water and injected at a higher rate.

TABLE 10

Results of Preliminary Dilution Tests

| Pipe Size (inch) | Gas Flow (MMs cfd) | Scavenger Injection Rate (gph) | Test No. | Scavenger Dilution | H$_2$S (ppm) Inlet | H$_2$S (ppm) 240 ft | Percent 240 ft H$_2$S Removal | $K_g a$ at 240 ft lb mol/ (h atm ft$^3$) |
|---|---|---|---|---|---|---|---|---|
| 6 | 10 | 1.08 | Baseline avg. | Full strength | 10.3 | 6.5 | 36.6 | 0.16 |
| | | 3.51 | D-1 | 31% dilution | 6.8 | 4.2 | 38.0 | 0.16 |
| 6 | 30 | 1.08 | Baseline avg. | Full strength | 10.2 | 4.5 | 55.8 | 0.85 |
| | | 3.51 | D-2 | 31% dilution | 7.7 | 3.2 | 58.4 | 0.90 |
| 2 | 3 | 0.20 | Baseli. ne avg. | Full strength | 9.7 | 0.80 | 91.3 | 2.42 |
| | | 0.65 | D-3 | 31% dilution | 11.2 | 0.40 | 96.5 | 3.40 |

The purpose of these tests was to increase the L/G ratio, which should increase the mass transfer coefficient, without increasing the overall chemical usage. The diluted scavenger was injected at rates corresponding to the baseline injection rates of the neat scavenger. For example, for the six-inch pipe tests, the diluted scavenger was injected at 3.51 GPH, which corresponds to the rate of 1.08 GPH for the neat scavenger in the baseline tests.

The results of these tests indicates some potential for improved $H_2S$ removal by injecting diluted scavenger, especially in the low flow-rate cases. The results from all three tests showed improvement in $H_2S$ removal efficiency.

In accordance with a particularly preferred embodiment of this invention, the contactor utilized in the method of this invention comprises a plurality of parallel pipes as shown in FIGS. 2 and 3 as described hereinabove. Tests were conducted in accordance with this embodiment designed for a maximum gas flow rate of 3.2 MMscfd. Tests were conducted at this flow rate with scavenger doses of 0.04, 0.08, 0.12 and 0.18 gal/ppmv/MMscf. (The scavenger dosage is calculated based on the concentration of $H_2S$ in the inlet sour gas.) Baker-Petrolite SULFA-SCRUB® HSW-700L was the scavenging agent used during the tests. Tests were also conducted at the design gas flow rate to determine the minimum scavenger dosage rate required to achieve for ppmv $H_2S$ at the contactor outlet. Once this dosage was determined for 3.2 MM scfd gas, the gas flow was reduced to 0.8 MM scfd to evaluate the turn down ability of the contactor. The results of these contactor tests are shown in Table 11.

TABLE 11

Novel Contactor Test Results

| Test No. | Nominal Gas Flow (MMscfd) | Scavenger Usage[1] (gal/ppmv/MMscf) | Scavenger Dosage[2] (gal/ppmv/MMscf) | $H_2S$ Concentration (ppm) Sour Gas | $H_2S$ Concentration (ppm) Treated Gas | Percent Removal |
|---|---|---|---|---|---|---|
| P-301 | 3.2 | 0.12 | 0.04 | 16.9 | 10.9 | 35% |
| P-302 | 3.2 | 0.15 | 0.09 | 16.9 | 7.2 | 58% |
| P-302R | 3.2 | 0.14 | 0.08 | 17.5 | 7.2 | 59% |
| P-303 | 3.2 | 0.15 | 0.12 | 16.9 | 2.8 | 83% |
| P-304 | 3.2 | 0.21 | 0.18 | 16.5 | 2.4 | 86% |
| P-306A | 3.3 | 0.13 | 0.09 | 16.5 | 5.5 | 67% |
| P-306A2 | 3.2 | 0.15 | 0.11 | 16.5 | 4.3 | 74% |
| P-306B | 0.8 | 0.14 | 0.11 | 16.8 | 4.3 | 75% |

Notes:
[1]Usage is based on ppmv $H_2S$ removed from the gas. Usage = (injection rate, gpd/gas flow rate, MMscfd)/(inlet $H_2S$, ppmv - outlet $H_2S$, ppmv). The lowest possible usage (based on laboratory testing) is 0.125 gal/ppmv/MMscf.
[2]Dosage is based on inlet $H_2S$ concentration. Dosage = (injection rate, gpd/gas flow rate, MMscfd)/(inlet $H_2S$, ppmv).

EXAMPLE CALCULATION OF ESTIMATED $H_2S$ REMOVAL EFFICIENCY USING EQUATION 4

Example

Estimate the $H_2S$ content of the treated gas for the following set of conditions:

Pipe diameter: 2 in nominal, 1.939 in actual
Gas flow rate: 4 MMscfd
Gas Pressure: 950 psig
Scavenger injection rate: 0.4 gallons per hour
Inlet $H_2S$ concentration: 15 ppm
Pipe length: 200 feet Calculate the molar mass velocity based on the gas flow rate and the cross sectional area of the pipe:

Gas flow rate=(4,000,000 scf/day)*(1 lb mol/379.4 scf)*(1 day/24 hours)

Gas flow rate=439.3 lb mol/hr

Cross sectional area of pipe=$(\pi/4)*(1.939\ in)^2*(1\ ft^2/144\ in^2)$

Cross sectional area=0.0205 $ft^2$

Molar mass velocity, G=(439.3 lb mol/hr)/(0.0205 $ft^2$)= 21,429 lb mol/$ft^2$/hr Calculate the L/G ratio in units of gal/MMscf:

L/G=(0.4 gal/hr)*(24 hr/day)/(4 MMscf/day)

L/G=2.4 gal/MMscf

Calculate the $K_g a$ value using Equation 4 and the regression coefficients for the 240 ft sampling location from Table 9:

$K_g a = C_1 G^{C2} (L/G)^{C3} D^{C4}$ $K_g a = 5.09 \times 10^{-08} (21429)^{1.82} (2.4)^{0.676} (1.939)^{-0.881}$ $K_g a = 3.92$ lb mol/hr/$ft^3$/atm Calculate the number of transfer units, NTU, using Equations 1 and 2:

$$NTU = \frac{(K_g a) P Z}{G}$$

P=950 psig=964.7 psia=65.6 atm
Z=Pipe length=200 feet

NTU=(3.92 lb mol/hr/$ft^3$/atm)*(65.6 atm)*(200 ft)/ (21429 lb mol/hr/$ft^2$)

NTU=2.40

Calculate the outlet $H_2S$ mole fraction using Equation 2:

$y_o = y_i / \exp(NTU)$ $y_o$=15 ppm/11.02

$y_o$=1.36 ppm

Percent removal of $H_2S$=91%

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A method for removal of $H_2S$ from an $H_2S$-containing natural gas stream comprising the steps of:
   inserting a contactor comprising a plurality of parallel pipes into said natural gas stream;
   injecting at least one $H_2S$ scavenging agent into said natural gas stream at a location one of upstream of said contactor and proximate an upstream portion of said contactor whereby said at least one $H_2S$ scavenging agent is distributed on at least a portion of at least one surface of said contactor;
   contacting said distributed $H_2S$ scavenging agent with said natural gas stream resulting in absorption of $H_2S$ into said $H_2S$ scavenging agent and reaction therewith, forming at least one by-product; and
   removing said at least one by-product from said natural gas stream.

2. A method in accordance with claim 1, wherein said contactor is constructed of a material which is unreactive with said at least one $H_2S$ scavenging agent, $H_2S$ and natural gas.

3. A method in accordance with claim 1, wherein flow of natural gas through each of said parallel pipes is modulated.

4. A method for removal of $H_2S$ from an $H_2S$-containing natural gas stream comprising the steps of:

passing said $H_2S$-containing natural gas stream through at least one pipe of a contactor comprising a plurality of parallel said pipes;

injecting at least one $H_2S$ scavenging agent into said natural gas stream at a location one of upstream of said at least one pipe and proximate an upstream portion of said at least one pipe whereby said at least one $H_2S$ scavenging agent is distributed on at least a portion of an interior surface of said at least one pipe;

contacting said distributed $H_2S$ scavenging agent with said natural gas stream resulting in absorption of $H_2S$ into said $H_2S$ scavenging agent and reaction therewith, forming at least one by-product; and removing said at least one by-product from said natural gas stream.

* * * * *